March 8, 1927.
H. D. MORTON
1,620,220
GUIDE AND CONDUCTOR FOR WELDING ELECTRODES
Filed Feb. 5, 1924    2 Sheets-Sheet 1
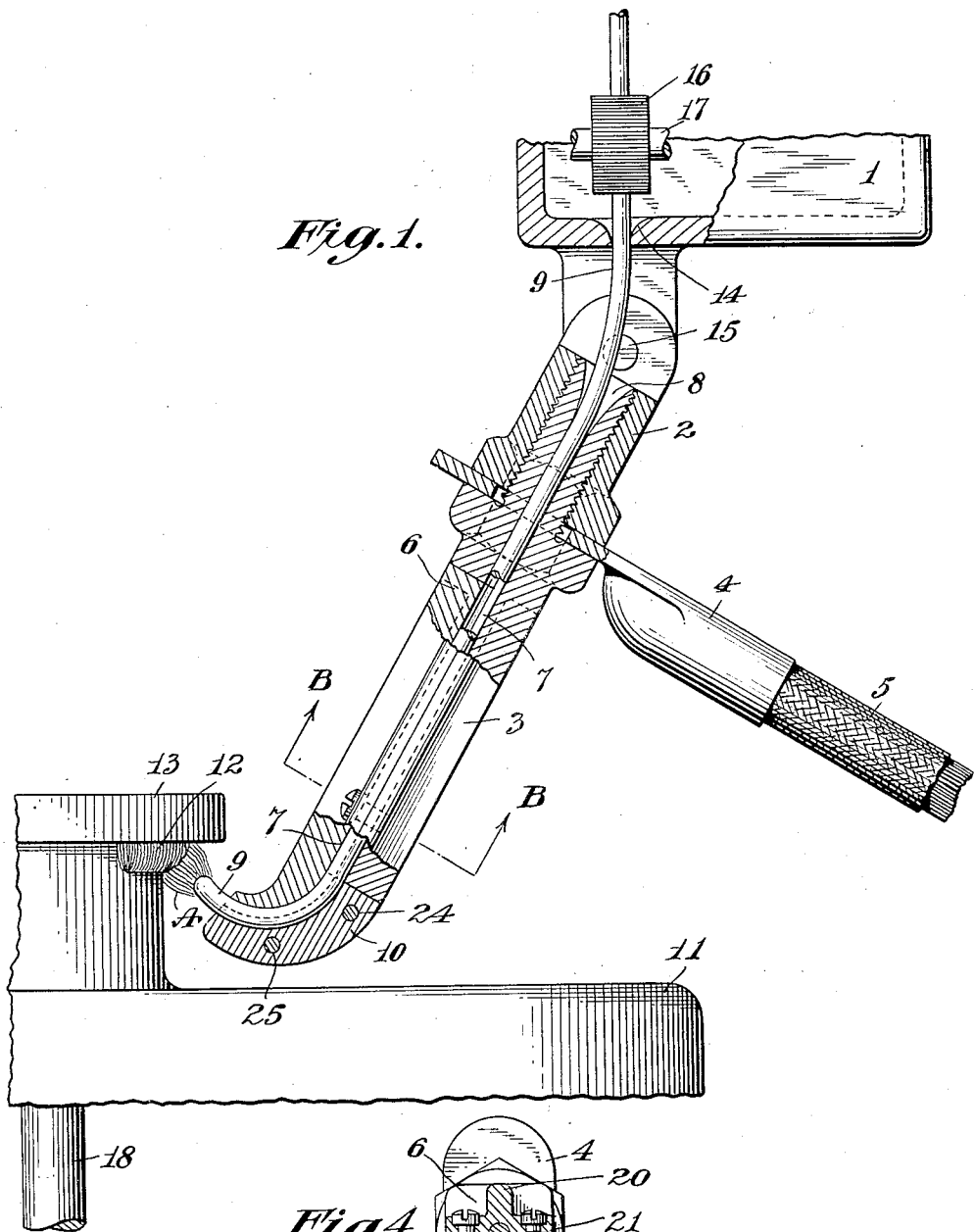
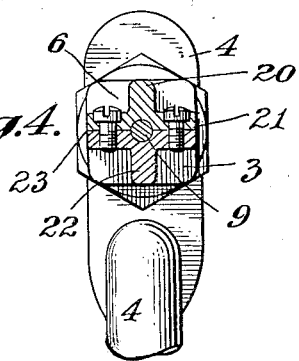
INVENTOR
Harry D. Morton
BY
ATTORNEYS March 8, 1927.
H. D. MORTON
1,620,220
GUIDE AND CONDUCTOR FOR WELDING ELECTRODES
Filed Feb. 5, 1924   2 Sheets-Sheet 2
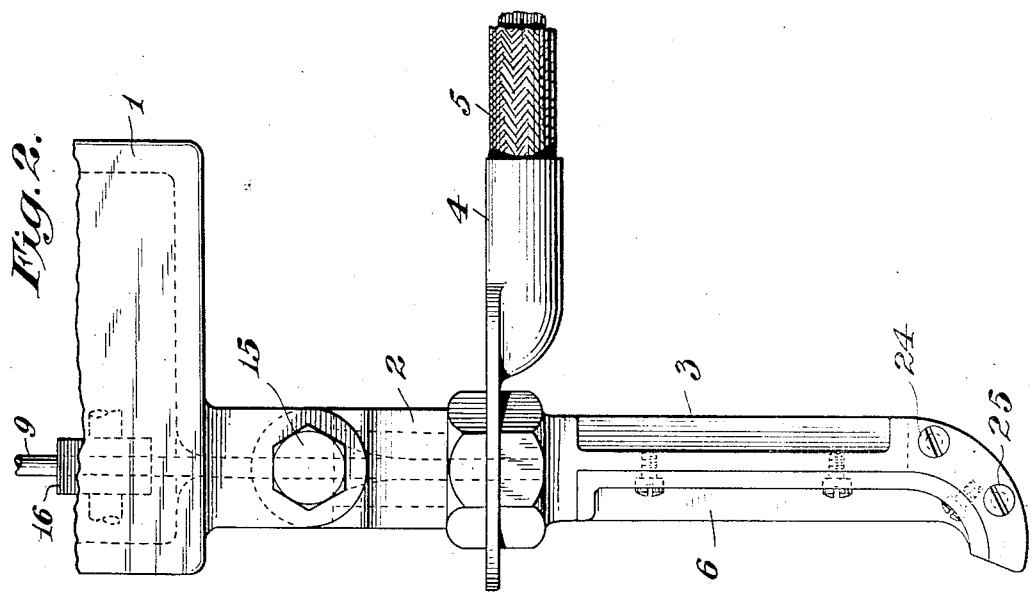
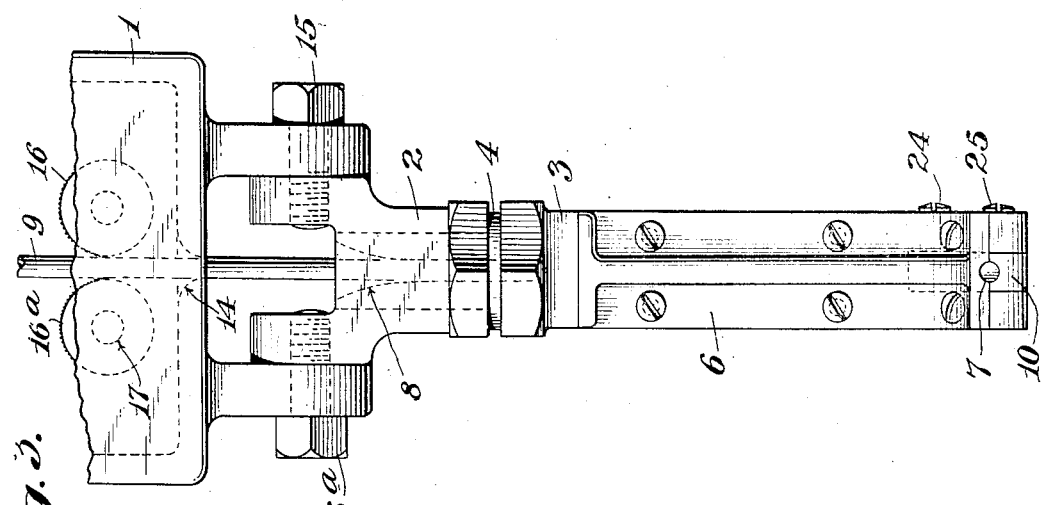
INVENTOR
Harry D. Morton
BY
Gifford & Scull
ATTORNEYS Patented Mar. 8, 1927.

1,620,220

UNITED STATES PATENT OFFICE.

HARRY D. MORTON, OF NEW YORK, N. Y.

GUIDE AND CONDUCTOR FOR WELDING ELECTRODES.

Application filed February 5, 1924. Serial No. 690,701.

The following is a description of a metallic welding guide and conductor and the methods of employing the same, embodying my invention in the form and manner at present preferred by me; but it will be understood that various modifications and changes may be made without departing from the spirit of my invention, and without exceeding the scope of my claims.

My invention will best be understood by reference to the accompanying drawings, in which I have illustrated the preferred form of device for carrying out my invention, and in which Fig. 1 shows a side elevation of the device, partly in section, indicating the manner in which the arc is directed to the work; Fig. 2 shows a side elevation of the device adjusted to a somewhat different position and with the work removed; Fig. 3 is a front elevation of Fig. 2; and Fig. 4 is a transverse cross-section of a portion of the device on the line B—B of Fig. 1. Like reference characters indicate like parts throughout the drawings.

Referring to the drawings, the welding head 1 has mounted in it the feed rolls 16 and 16ᵃ (Fig. 3) for feeding the metallic welding strip 9 through an opening in the bottom of the welding head, through passage 8 (Fig. 1) in guide support 2, and pas sage 7 in guide 19 to the arc A, shown in Fig. 1, between the end of the welding strip 9 and the seam in the work, comprising the cylinder 11 and the disk 13 to be attached thereto by weld 12. The feeding of the welding strip may be effected automatically by power applied to shaft 17 of feed roll 16ᵃ (Fig. 3). Feed rolls 16 and 16ᵃ preferably have serrated perimeters to insure a positive feeding of welding strip 9.

The work is connected (by means not shown) to one pole of a source of welding current, and welding strip guide 3 is connected to the other pole of said source by lug 4 and cable 5. Current is carried by guide 3 to welding strip 9 at a point close to the arc. The walls of the welding strip guide are rigid, and the bending of the welding strip by the guide, during the feeding operation, causes the strip to be forced against the walls of the guide, resulting in a continuous pressure between said strip and guide and thus forming a good electrical contact.

The work may be rotated by manual or automatic movement of the shaft 18. Alternatively, the work may be stationary and the welding head may be caused to rotate about it, either manually or automatically, by means well known to those skilled in the art. In either case, a continuous weld will be formed. As appears from Fig. 1, passage 7 through welding strip guide 3 is curved at its lower end, which lower end is operatively positioned close to the arc. While the direction of feed of the welding strip within the welding head is in a straight line, the welding strip is curved in its passage through guide 3, thus permitting of directing the arc to and producing a weld upon the under side of the projecting portion of disk 13. Welding head 1 is located at a constant distance from work 11.

Referring to Figs. 2 and 3, welding strip guide support 2 is pivotally mounted between projection on the bottom of welding head 1, being operatively held in position by bolts 15 and 15ᵃ. The guide can thus be adjusted at any desired angle to cause the arc to properly impinge upon the seam to be welded, hence making it possible to direct the arc to, and to effect welds in, joints which would be inaccessible if the welding strip were fed from the welding head and issued from the guide in a straight line. For instance, while the character of the work may be such as to necessitate placing the welding head over the work, the lower end of the welding strip may be caused to actually feed upwardly as shown in Fig. 1.

In order to facilitate machining of the curved passage 7 (Fig. 1) in the welding strip guide, I preferably form said guide of two members, 3 and 6, which may be attached either in the plane shown in Fig. 1 or in a plane at right angles thereto.

In order to render more certain the bending of welding strip 9 and to prevent undue wear upon the curved portion of passage 7 (Fig. 1), I preferably form one side of this curved portion of hard material, such as hardened steel. For example, this portion may be formed of a block 10 (Fig. 1 and Fig. 3) of such material inserted in a slot formed in the lower end of member 3, and held in position by screws 24 and 25, of Figs. 2 and 3.

I preferably form fins such as 20, 21, 22 and 23 shown in Fig. 4 on the welding strip guide 3 in order to dissipate the radiant heat from the arc.

In order that successful weld may be effected, it is essential that the work material shall be fused equally on, and molten metal from the welding strip shall be applied equally to, both sides of the seam. Thus it is necessary that the line of direction at which the arc impinges upon the work shall bisect the angle adjacent to the seam to be welded. By my invention I am enabled to accomplish this result and to produce successful welds on work such as that shown in Fig. 1, the form of which renders it impossible to reach the seam with a welding strip which is fed in a straight line.

Pivotally mounting the guide which curves the welding strip greatly increases the range of work to which the device is applicable.

While I have shown the passage in the guide as partly curved, it is obvious that other forms of multi-directional passages could be used.

In my application Serial No. 432,951 I have pointed out the advantages and broadly claimed the feature of conveying current to a welding electrode at a point close to and at a constant distance from the arc, and I now claim this feature as applied to a curved welding strip.

What I claim as new and desire to secure by Letters Patent of the United States is:

1. In a stationary metallic arc welding machine, means constructed and arranged to feed a welding strip downward, means operating at a constant distance from said feeding means for upwardly deflecting the end of the welding strip in order that an arc maintained between the end of said welding strip and work material may bisect the included angle of the seam to be welded.

2. In electric arc welding, stationary means for feeding an electrode downwardly, a guide for receiving the electrode from the feeding means and constructed and arranged to upwardly deflect the end of the electrode at a fixed distance from the feeding means in order that an arc maintained between the end of said welding strip and work material may bisect the included angle of the seam to be welded.

3. In an electric arc welding machine, a welding strip guide having a passage therethrough and formed of two jointedly connected members.

4. In electric arc welding wherein a welding strip constituting one electrode is automatically fed from a welding head to the work constituting the other electrode, means for automatically moving the work relatively to the welding strip feeding means, and a curved electrode guide operatively locked to the welding head for initially feeding the welding strip away from the plane of the feeding means and continuously curving it so that it ultimately feeds toward said plane in order to deposit molten metal upon difficultly accessible portions of the work.

5. In electric arc welding, a stationary welding head and an electrode delivery nozzle hinged to said head and operatively rigidly attached thereto and constructed and arranged to bend a metallic electrode fed therethrough so that it will issue from said nozzle at a point close to the work to be welded and at an angle of more than ninety degrees from the line of its direction upon entering said nozzle, in order that an arc maintained between said work and the end of said electrode may bisect the included angle of the seam to be welded.

6. In electric arc welding, a stationary welding head, means associated with said head for feeding a metallic welding strip and means hinged and locked to said welding head and constructed and arranged to initially guide said welding strip in a downward direction and to thereafter continuously bend said welding strip so that the end thereof issuing from said guide shall feed in an upwardly direction throughout the welding operation, in order that an arc maintained between difficulty accessible portions of work material and the end of said electrode may bisect the included angle of the seam to be welded.

HARRY D. MORTON.